United States Patent [19]

Schwartz et al.

[11] Patent Number: 4,958,938

[45] Date of Patent: Sep. 25, 1990

[54] TEMPERATURE TRANSMITTER WITH INTEGRAL SECONDARY SEAL

[75] Inventors: Bradley N. Schwartz, Lakeville; Stanley Kugler, Golden Valley; Donald W. Selg, Mendota Heights, all of Minn.

[73] Assignee: Rosemount Inc., Eden Prairie, Minn.

[21] Appl. No.: 361,239

[22] Filed: Jun. 5, 1989

[51] Int. Cl.$^5$ .......................... G01K 1/08; G01K 1/10
[52] U.S. Cl. ..................... 374/208; 277/28; 136/232; 136/230
[58] Field of Search ............. 374/208, 138, 54, 186; 174/152 R; 277/28; 136/230, 232, 233, 234, 202

[56] References Cited

U.S. PATENT DOCUMENTS

| | | | |
|---|---|---|---|
| 1,615,451 | 1/1927 | Harrison | 374/208 |
| 1,675,210 | 6/1928 | Campbell et al. | 374/208 |
| 2,992,402 | 7/1961 | Thomas | 136/230 |
| 3,328,039 | 6/1967 | McKeough | 277/28 |
| 3,443,251 | 5/1969 | Garstang et al. | 174/152 R |
| 3,462,315 | 8/1969 | Verrando et al. | 136/230 |
| 3,714,012 | 1/1973 | Herron | 174/152 R |
| 4,162,929 | 7/1979 | Finney | 136/232 |
| 4,376,227 | 3/1983 | Hilborn | 136/232 |
| 4,385,197 | 5/1983 | Schwagermann | 136/230 |
| 4,410,756 | 10/1983 | Schwagermann | 374/208 |
| 4,525,081 | 6/1985 | Myhre | 374/208 |
| 4,623,266 | 11/1986 | Kielb | 374/181 |
| 4,830,515 | 5/1989 | Cortes | 374/208 |
| 4,841,274 | 6/1989 | Yagher, Jr. et al. | 374/208 |
| 4,848,927 | 7/1989 | Daily et al. | 374/208 |

FOREIGN PATENT DOCUMENTS

| | | | |
|---|---|---|---|
| 2045433 | 10/1980 | United Kingdom | 374/208 |
| 2048474 | 12/1980 | United Kingdom | 374/208 |
| 2115550 | 9/1983 | United Kingdom | 374/208 |
| 2132766 | 7/1984 | United Kingdom | 136/230 |

Primary Examiner—William A. Cuchlinski, Jr.
Assistant Examiner—Diego F. F. Gutierrez
Attorney, Agent, or Firm—Kinney & Lange

[57] ABSTRACT

A temperature transmitter connects to a first conduit containing leads from a temperature sensor and also to second conduit which conveys the output leads of the transmitter to a remote location. A wall in the transmitter divides the transmitter into first and second compartments sealed from one another. The first compartment receives the leads from the temperature sensor and contains the electric circuit for converting the signal of the temperature sensor to an output signal representative of temperature. A feedthrough passing through the wall connects the output signal to the output leads in the second compartment. The arrangement blocks the flow of potentially hazardous fluid from the first conduit through the second conduit to a remote location such as a control room. The transmitter thus provides an integral seal between the conduits and use of an external conduit seal in the second conduit can be avoided.

9 Claims, 4 Drawing Sheets

TEMPERATURE TRANSMITTER WITH INTEGRAL SECONDARY SEAL

BACKGROUND OF THE INVENTION

1. Field of the Invention

The present invention relates to sealing a temperature transmitter to prevent leakage of fluids through a conduit connected to control equipment.

2. Description of the Prior Art

Temperature sensors for process fluids are typically fitted with a primary seal, such as a thermowell 10 in a PRIOR ART installation shown in FIG. 1. The primary seal blocks leakage or flow of process fluid 12 past a sensor 14 into an electrical conduit 16 carrying the temperature sensor's electrical leads 18 to a converter 19 in a compartment 20 of temperature transmitter 11. Another electrical conduit 22 carries output leads 24 from converter 19 to a remote location such as a control room. In the event of failure or leakage of the primary seal, pressurized process fluid can flow past the sensor through conduit 16, then through compartment 20, and finally through conduit 22 to the control room. In addition to the problem of primary seal failure, there is also a problem in some installations with condensation of moisture or corrosive fluids from the air which fills the conduit connecting the temperature sensor with the temperature transmitter. Gasses can enter the conduit through leaks and vents, as well. Process fluid, condensation or gasses leaking into control rooms can damage equipment or introduce noxious gasses or ignition problems into the control room.

To block flow of fluids to control equipment, provision of a seal in the conduit system between the transmitter and the control room is desired, and in some instances is required by the National Electrical Code (NEC), paragraph NEC 501-5.f.3. In the past, conduits has been fitted with a sealing device such as drain-seal 26 shown in FIG. After leads 24 have been pulled through the drain-seal, the drain-seal is filled with a packing or potting compound 27 to block leakage of fluid. Additional drain-seals have also been installed between the thermowell and the transmitter. Installation of the drain-seal requires several installation steps which can be inadvertently overlooked during field installation. Testing the secondary seal under field conditions is difficult, and the installation of the drain-seal is costly and time consuming.

Another PRIOR ART temperature transmitter shown in FIG. 2 is similar to the transmitter shown in U.S. Pat. No. 4,623,266 to Kielb, incorporated herein by reference, and has converter circuitry 30 installed in a compartment 32 which is sealed from a wiring compartment 34 containing terminals for leads for both the temperature sensor and the transmitter output. The converter circuitry 30 is sealed from the process fluid, but fluid can still flow between conduit entry ports 36 through the wiring compartment 34 to a remote location, necessitating a separate drain-seal with this transmitter as well.

A different arrangement is desired which avoids the use of such a separate drain-seal in electrical conduit systems connecting temperature transmitters to control equipment while still maintaining a seal which blocks leakage of fluids from the transmitter to the remote location

SUMMARY OF THE INVENTION

A temperature sensor provides a signal representative of a sensed temperature of a process to the temperature sensor's leads. A first conduit carries the temperature sensor's leads to a first compartment in a temperature transmitter. The first conduit contains gas subject to contamination by undesired fluids such as leaked process fluid, condensation or corrosive or combustible atmospheres. The undesired fluid can flow into the first compartment. A wall or bulkhead in the temperature transmitter sealingly divides the first compartment from a second compartment in the transmitter and blocks flow of the fluid into the second compartment. Output leads of the transmitter are coupled from the second compartment to a second conduit which carries the leads to a remote location. The second compartment, the second conduit, and the remote location are separated from the undesired fluid and are not exposed to contamination.

Converter means are disposed in the first compartment and have converter terminals receiving the leads from the temperature sensor, and an electric circuit for converting the sensor signal to an output representing temperature. First feedthrough means sealingly pass through a region in the wall and have conductors electrically insulated from the wall for conducting the output to the output leads. The sealed feedthrough means maintain the integrity of the seal provided by the wall.

In a preferred embodiment, the electric circuit is sealed between a cover and the region of the wall having the first feedthrough. A second sealed feedthrough passes through the cover to provide redundant fluid seals in the transmitter separating the first and second conduits.

DETAILED DESCRIPTION OF THE PREFERRED EMBODIMENTS

Figure 1:
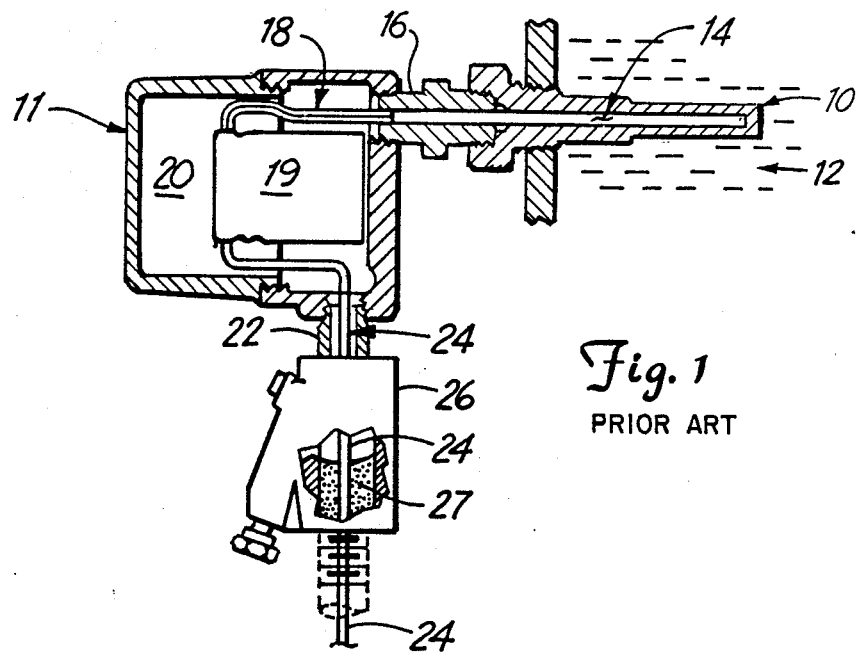
FIG. 1 is a cross sectional view of a PRIOR ART installation of a temperature transmitter.
Figure 2:
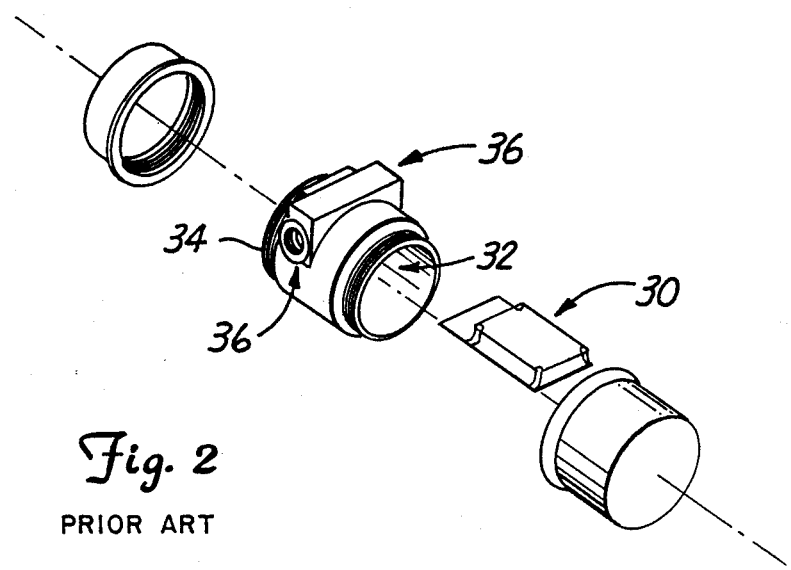
FIG. 2 is an exploded view of a PRIOR ART temperature transmitter.
Figure 3:
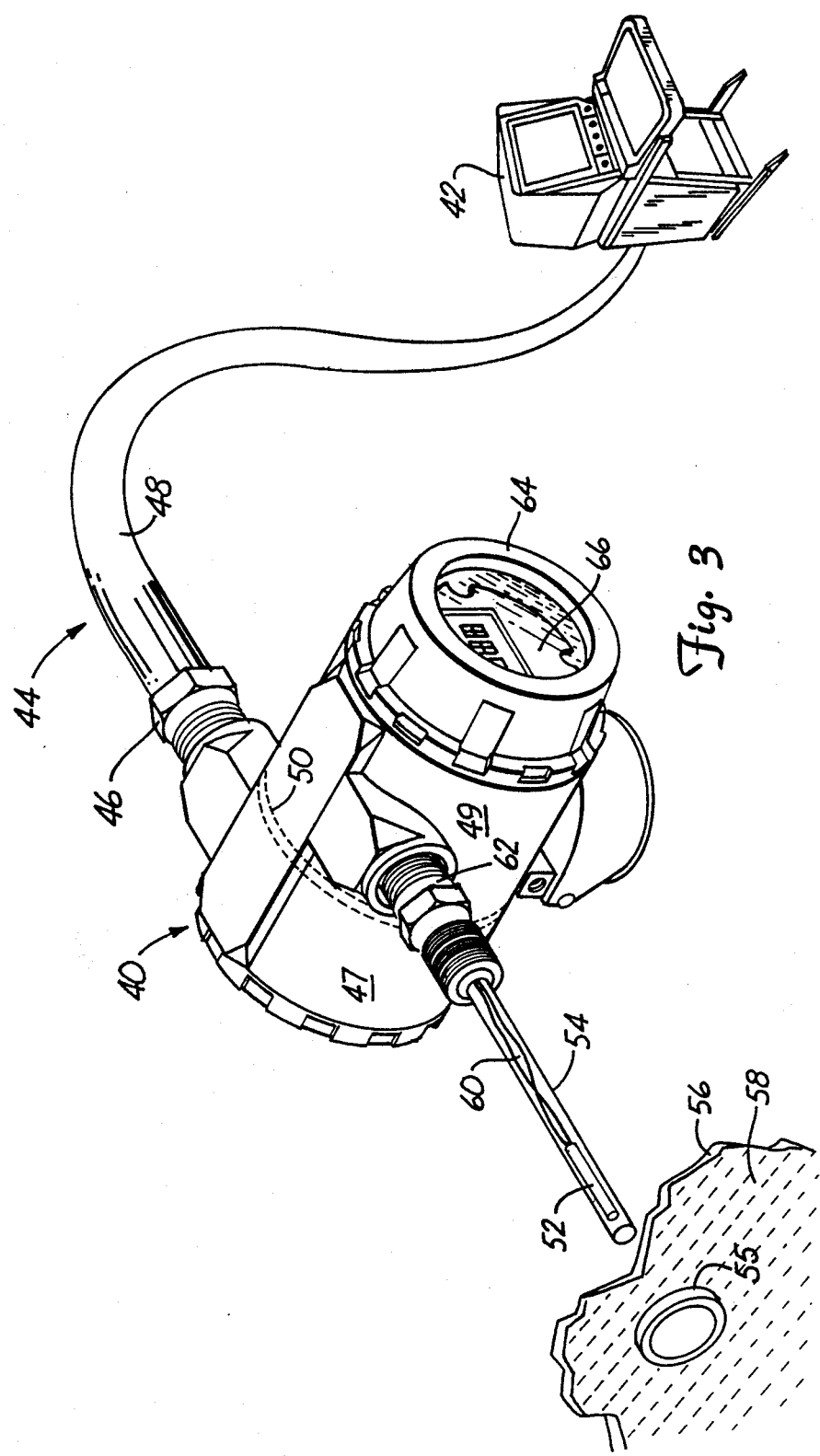
FIG. 3 is a view of a temperature transmitter installation according to the present invention.

In FIG. 3, a temperature sensor 52 is disposed in a thermowell 54 which can be inserted through a threaded hole 55 into a tank 56 for sensing the temperature of a pressurized process fluid 58 contained in the tank. The temperature sensor 52 can be a platinum resistance thermometer (PRT), thermocouple, thermistor, or the like and has leads 60, or extensions of such leads, running through a conduit fitting 62, or a more lengthy conduit system, to one interior compartment of an enclosure 49 in a transmitter 40. The thermowell 54 provides a primary barrier or seal which prevents or blocks flow of process fluid past the sensor 52 into the conduit fitting. The transmitter 40 according to the present invention also provides an output to control room equipment 42 along conduit system 44 comprising conduit fitting 46 and conduit tubing 48. The transmitter 40 is divided into two enclosures 47, 49 sealed from one another by a wall or bulkhead 50 outlined in FIG. 3. A threaded circular cover 64 of enclosure 49 includes a transparent window 66 which permits inspection of the interior compartment of enclosure 49 for the presence of process fluid indicating failure of the primary seal provided by the thermowell. The wall 50 prevents the flow of undesired fluid such as process fluid, condensation, or corrosive or combustible vapors into the conduit system 44 as explained below in connection with FIG. 4.

Figure 4:
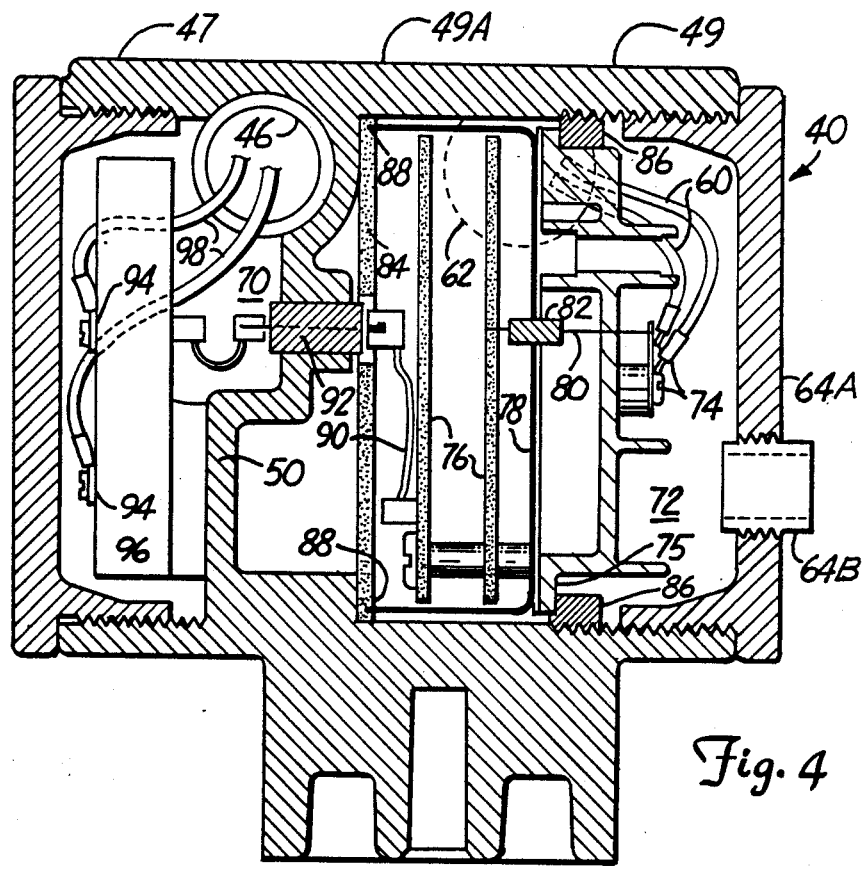
FIG. 4 is a cross sectional view of a temperature transmitter according to the present invention.

In FIG. 4, The transmitter 40 is shown in cross-section and includes a first compartment 72 in enclosure 49 separated by the wall 50 from the compartment 70 in enclosure 47. Enclosures 47 and 49 including wall 50 are preferably formed as a single generally cylindrical metal casting or molded plastic part to reduce the number of seals required.

First compartment 72 is shown closed by a threaded cover 64A. Cover 64A can be removed to inspect for process fluid in compartment 72, or alternatively a windowed cover 64 (FIG. 3) can be used in its place. Cover 64A can be fitted with a vent 64B, if desired, so that process fluid is vented if the primary seal fails. Sensor leads 60 emanate from the conduit fitting 62 and are electrically connected to terminals 74 of a terminal block 75 in compartment 72. Terminal block 75 can include cold junction compensation for thermocouple sensors as described in U.S. Pat. No. 4,623,266 to Kielb, incorporated herein by reference. Terminals 74 connect via conductors 80 of a sealed, insulated feedthrough 82 to an electronic converter circuit 76 comprising printed circuit board assemblies. The feedthrough 82 is preferably a capacitive feedthrough for suppressing electrical noise. Electronic converter circuit 76 is sealingly enclosed between a cup-shaped cover 78 and wall 50 by a resilient gasket 84. An annular threaded ring 86 is screwed into the housing and presses against the terminal block 75 and cover 78, compressing the cup-shaped cover 78 against the gasket 84 and wall 50 at rim 88 to seal the converter circuit 76 from the atmosphere, humidity or fluid present in compartment 72. This sealing of the converter circuitry by cover 78 and gasket 84 protects the converter circuitry from humidity in the event that cover 40 is inadvertently left off the transmitter in the field. Cover 78, wall 50 and gasket 84 are preferably formed of electrically conductive materials so that electrical contact is established at rim 88, completing an electrostatic or Radio Frequency Interference (RFI) shield around the converter circuit 76 to reduce the effects of electrical noise or conducted RFI on the circuitry. The first compartment 72 is thus divided into two smaller compartments that are sealed from one another, both with respect to fluid flow as well as electrical noise.

The converter circuit 76 receives a signal representative of temperature from the leads 60 and converts this signal to an output which can be transmitted over a 2 wire circuit such as a 4 to 20 milliampere signal. Converter circuit 76 is preferably energized from the 4 to 20 milliampere, 2 wire circuit as well. Adjustment of span and zero setting of transmitter 40 is preferably accomplished by digital signals applied to the 2 wire circuit as well. The output representative of temperature of electronic converter circuit 76 is connected via a multiconductor cable 90 to a feedthrough 92 sealingly passing insulated conductors through the wall 50. Feedthrough 92 is preferably threaded into wall 50 to provide a joint between the feedthrough 92 and wall 50 which quenches flames in the event of ignition in either compartment 70 or 72. Feedthrough 92 is also preferably a feedthrough capacitor to provide suppression of electrical noise. The conductors of feedthrough 92 connect to terminals 94 on a second terminal block 96 in the second compartment 70. Output leads 98 connect to the terminals 94 for coupling the output to a remote location through conduit 46. Additional circuitry, such as noise and transient suppression circuitry, a series connected diode providing reverse polarity protection, a cold junction compensation sensor and the like can be included in terminal block 96, as well.

When the primary seal fails, there can be leakage of process fluid from conduit fitting 62 into first compartment 72. Condensation or corrosive or noxious gasses can also be present in first compartment 72. The cover 78 and gasket 88 provide a first fluid barrier preventing flow of the process fluid into the converter circuitry 76 and compartment 70. As the pressure of fluid in compartment 72 increases, the force on cover 78 also increases, resulting in an even greater sealing force at rim 88. Even if the seal at rim 88 would fail, the feedthrough 92 and wall 50 provide yet another barrier blocking flow of process fluid into compartment 70 which is open to the control room via conduit 46. The arrangement thus provides a seal which provides redundant protection against the flow of fluid into the control room. The temperature transmitter 40 can be installed in a control system as shown in FIG. 3 without the need for a vent-seal in the conduit system 44 between the transmitter 40 and the control equipment 42.

When the transmitter 40 is used with a temperature sensor having a primary seal, three separate seal failures must occur before process fluid can pass through the output conduit to the control room. The installation of the secondary seal cannot be overlooked during field installation of the transmitter because the secondary seal is an integral part of the transmitter. The need for vent-seals in the process control system is reduced or eliminated, resulting in a lower cost installation. In installations where there are problems with moisture condensation in the conduit leading to the sensor, the transmitter prevents this moisture from flowing through the conduit system to the control room. In other applications where there are corrosive or noxious gasses present in the conduit leading to the sensor, the transmitter prevents these gasses from contaminating the air in the control room through the conduit system. The temperature sensor leads and the output leads can be kept electrically isolated from one another because they are in separate compartments, reducing the possibility of electrical interference. The multiple conductive bulkhead arrangement in the transmitter and the use of feedthroughs through the bulkheads provides additional electrical isolation and freedom from electrical interference.

Figure 5:
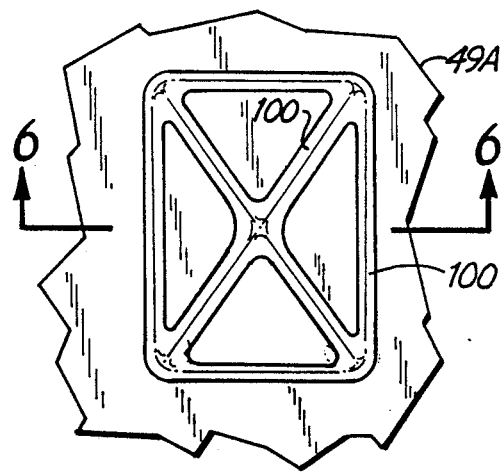
FIG. 5 is a plan view of a portion of a wall of a temperature transmitter housing.
Figure 6:
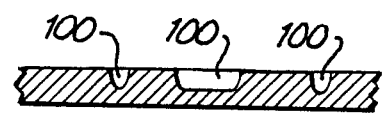
FIG. 6 is a cross section of the portion of wall shown in FIG. 5.

In FIGS. 5 and 6, a portion of a wall 49A of first compartment 72 is shown. A groove 100 in the wall 49A provides a pressure relief region which will break out to relieve pressure in the event of excess pressurization of compartment 72 after a failure of the primary seal in the thermowell. The break out region is located on an exposed outer surface of the transmitter housing to provide a visible indication of primary seal failure. Additional indication of primary seal failure can be provided by means of pressure or moisture sensors in compartment 72 coupled to the converter circuitry to alter its output as an indication of seal failure.

In FIG. 4, as explained above, the electronic converter circuit 76 and the sensor leads 60 are disposed on one side of wall 50, while the output leads 98 are disposed on the opposite side of the wall 50. In an alternative embodiment of the invention, the connections of the converter's sensor and the output leads can be exchanged with each other, and the conduit connections can be exchanged with each other, so that the converter circuit and the output leads are disposed on one side of a wall and the sensor leads are disposed on the opposite side of the wall. In such an alternative transmitter embodiment, the leads 98 in FIG. 4 would be sensor leads and feedthrough 92 would carry the sensor signal to electronic converter circuit 76, while the transmitter output would be coupled through feedthrough 82 in cover 78 to leads 60. In this alternative embodiment, leads 60 would couple the transmitter's output to the control room. In this alternative embodiment, when the primary seal fails, compartment 70 can be pressurized by the process fluid, but the electronic converter circuit is separated from leaked process fluid by the thicker cast wall 50 rather than by the thinner cover 78.

Although the present invention has been described with reference to preferred embodiments, workers skilled in the art will recognize that changes may be made in form and detail without departing from the spirit and scope of the invention.

What is claimed is:

1. A temperature transmitter connectable to a first conduit subject to fluid contamination which contains a lead from a temperature sensor and also connectable to a second conduit which conveys an output lead to a location remote from the transmitter, comprising:

wall means disposed in the transmitter for sealingly dividing the transmitter into first and second compartments, the first compartment opening to the first conduit for receiving the lead from the temperature sensor, and the second compartment opening to the second conduit for receiving the output lead;

converter means, disposed in the first compartment and having converter terminals receiving the lead from the temperature sensor, and an electric converter circuit for providing an output representing temperature;.and feedthrough means sealingly passing through the wall means and having conductors electrically insulated from the wall for conducting the output to the output lead such that the transmitter blocks flow of the fluid contamination to the second conduit and to the remote location.

2. The transmitter of claim 1 wherein the transmitter further includes the temperature sensor sensing a temperature of a process fluid, the temperature sensor having a primary seal between the process fluid and the first conduit blocking flow of the process fluid into the first conduit.

3. The transmitter of claim 2 wherein the transmitter wall and feedthrough means provide a secondary seal blocking flow of process fluid through the second conduit to the remote location when the primary seal fails.

4. The transmitter of claim 3 wherein the first compartment is sealed to contain the process fluid's pressure.

5. The transmitter of claim 1 wherein the converter means further comprises container means disposed in the first compartment for containing the electric circuit.

6. The transmitter of claim 5 wherein the electric circuit is sealingly contained between the container means and the wall for blocking flow of the fluid to the electric circuit.

7. The transmitter of claim 6 wherein the container means further comprises second feedthrough means for sealingly connecting the converter terminals to the electric circuit, thereby providing a redundant seal between the first and second conduits.

8. The transmitter of claim 7 wherein the container is formed of an electrical shield material such that the transmission of electrical noise between the leads of the temperature sensor and the electric circuit is reduced.

9. The transmitter of claim 1 wherein the wall is formed of an electrical shielding material and the feedthrough means further comprise feedthrough capacitors such that the wall and the feedthrough means reduce the transmission of electrical noise between the first and second compartments.

* * * * *